United States Patent [19]
Welsch et al.

[11] Patent Number: 5,174,676
[45] Date of Patent: Dec. 29, 1992

[54] POST CONNECTOR

[75] Inventors: John H. Welsch, Moscow; Albert Kolvites, Mountaintop, both of Pa.

[73] Assignee: InterMetro Industries Corporation, Wilkes-Barre, Pa.

[21] Appl. No.: 796,392

[22] Filed: Nov. 22, 1991

Related U.S. Application Data

[63] Continuation of Ser. No. 674,478, Mar. 27, 1991, abandoned, which is a continuation-in-part of Ser. No. 527,387, May 23, 1990, Pat. No. 5,022,777.

[51] Int. Cl.$^5$ ............................................. B25G 3/00
[52] U.S. Cl. ................................... 403/14; 403/292; 403/298
[58] Field of Search .............. 403/292, 298, 280, 14; 411/479, 476, 508, 509, 510

[56] References Cited

U.S. PATENT DOCUMENTS

| | | | |
|---|---|---|---|
| 1,344,596 | 6/1920 | Schaefer | 411/479 |
| 1,354,549 | 10/1920 | Gilmer | 403/280 |
| 2,650,516 | 9/1953 | Poupitch | 411/508 |
| 2,758,498 | 8/1956 | Johnson | 411/508 |
| 3,352,191 | 11/1967 | Crawford | 403/292 X |

FOREIGN PATENT DOCUMENTS

| | | | |
|---|---|---|---|
| 2725921 | 12/1978 | Fed. Rep. of Germany | 403/292 |
| 974115 | 11/1964 | United Kingdom . | |
| 2147680 | 5/1985 | United Kingdom . | |

*Primary Examiner*—Andrew V. Kundrat
*Attorney, Agent, or Firm*—Fitzpatrick, Cella, Harper & Scinto

[57] ABSTRACT

A connector sleeve device for connecting together first and second posts, comprises a sleeve having an outer surface dimensioned to be received within the interior surfaces of the first and second posts. A first flexible protrusion is formed in a mid-region of the sleeve and has an abutment surface adapted to abut an end surface of the first post when the sleeve is received therein. The contact between the abutment surface and the end surface prevents the sleeve from being moved further into the second post. A second flexible protrusion is formed in the mid-region of the sleeve and has a second abutment surface adapted to abut an end surface of the second post when the sleeve is inserted into the second post. The contact between the second abutment surface and end surface of the second post prevents the sleeve from being moved further into the second post. The abutment surfaces of the first and second flexible protrusions are formed in substantially the same cross-sectional radial plane relative to the sleeve so that the end surfaces of the first and second posts can mate together, making the sleeve substantially invisible. Preferably, the flexible protrusions are inclined tabs disposed on opposite slides of a hollow cylindrical sleeve and are fluted in cross-section.

17 Claims, 2 Drawing Sheets

POST CONNECTOR

This application is a continuation of Ser. No. 07/674,478 filed Mar. 27, 1991, now abandoned, which is a continuation-in-part of application Ser. No. 07/527,387, Filed May 23, 1990 now U.S. Pat. No. 5,022,777.

BACKGROUND OF THE INVENTION

1. Field of the Invention

This invention relates to post a connector device, and particularly, to a connector that quickly, reliably, and invisibly connects first and second hollow posts.

2. Description of the Prior Art

Many products now on the market include hollow load-bearing posts, such as shelving, and the like. The transportation of such products has often been unwieldy and expensive due to the extensive length of the support posts. Shipping such posts in smaller segments would be advantageous, except for the difficulty of quickly and easily assembling the posts such that they retain the load-bearing capabilities of a unitary structure. Further, many of the known devices for coupling post segments together include structure on the outside of the posts, thus displaying an unsightly connection, and providing an element that may interfere with the operation of the post itself. For example, shelving systems are known wherein the shelves are vertically adjustable with respect to a plurality of posts. Any coupling structure attached to the outside of such posts would make the vertical adjustment of the shelves difficult or impossible.

Connecting post segments together with structure inside the segments often requires wedges, clamps, screws, or other hardware that in turn require extensive manipulations for assembly. In addition, such interior structures may be mislocated relative to the joint between two post segments, thus inviting mechanical failure of the post itself or at the joint.

Connectors having a centrally located circumferential rib on their outer surface are also known. The rib prevents the connector from being inserted too far into either of the post segments coupled together. However, such a rib is visible when the assembly is complete. Such arrangement is also less than satisfactory in applications that require highly sanitary conditions.

Therefore, it is desireable to provide a post connector structure that is easy to manufacture, easy to assemble, and inexpensive, yet provides an invisible, strong connection between post segments.

SUMMARY OF THE INVENTION

The present invention provides a post connector that overcomes many of the disadvantages of known connectors, such as those described above.

In its preferred embodiment, the present invention includes a connector sleeve for connecting together first and second posts. The sleeve has an outer surface dimensioned to slide tightly with a friction fit within the interior surface of both the first and second posts. A first flexible protrusion is formed at a mid-region of the sleeve and has a first interference or abutment surface adapted to abut an edge surface of the first post when the sleeve is inserted into the first post. This protrusion prevents the sleeve from being moved further or excessively into the first post. A second flexible protrusion is also formed in the mid-region of the sleeve and has a second interference or abutment surface adapted to abut an edge surface of the second post when the sleeve is inserted into the second post. Again the second protrusion prevents the sleeve from being moved further or excessively into the second post. The second interference surface is disposed substantially in the same radial plane as the first interference surface to cause the edge surfaces of the first and second posts to come into contact when the sleeve is assembled with them. When the first and second posts edge surfaces come together, the flexible protrusions may be moved out of abutting engagement with the post edge surfaces.

In accordance with a further aspect of the present invention, a post connector for connecting together first and second posts includes a compressible insert adapted to be partially inserted into each of the first and second posts. The insert has a compression slot extending in the axial or longitudinal direction thereof to allow the insert to be compressed to provide a tight friction fit inside the first and second posts. First and second inclined protrusions extend from the outer surface of said insert and incline in opposite directions. Each protrusion has an abutment surface for abutting an engaging surface of a respective post. The abutment surfaces are substantially radially coplanar or slightly spaced away from each other relative to the radial plane to cause the engaging surfaces of the first and second posts to be adjacent each other with the insert substantially entirely within the posts and equally within the respective posts when the posts are connected together.

In accordance with still a further aspect of the present invention, a connector for coupling together first and second posts includes a bushing adapted to fit partially within the first post and partially within the second post, the bushing being compressible to provide a flush fit between it and each of the posts. First and second tabs are disposed on the bushing an engage respective end surfaces of the post. Each tab has a first position protruding from the outer surface of the bushing to engage one of the post end surfaces, and a second position substantially flush with the outer surface of the bushing. The tabs are biased toward their first position to cause the bushing to assume a predetermined positional relationship with respect to the posts when the posts are forced together. Forcing the posts together causes the tabs to be moved to their second positions.

Preferably, the interference or abutment surfaces of the protruding tabs are disposed approximately at the center of the bushing so that when the first and second posts are joined together, one half of the bushing extends into each of the posts. This configuration aids in the structural stability of the connector.

Also and preferably, the bushing is a one-piece hollow cylindrical piece of rolled steel, the tabs being integral therewith. The first and second posts may, in certain applications have annular rings on their interior surfaces to compress the bushing together and to provide a secure contact between the posts and the bushing.

According to a further aspect of the present invention, the first and second resilient tabs may be bent or fluted in cross section in order to facilitate their abutment with the contact surfaces of the hollow posts. Preferably, the fluted first and second tabs are flared in a direction away from the surface which contacts the hollow member. Also, the compression slot may extend axially and have two angled end portions that prevent parts from interlocking during the production and packaging.

The advantageous structure and functions according to the present invention will become apparent from the following detailed description of the preferred embodiments, when taken in conjunction with the accompanying drawings.

DETAILED DESCRIPTION OF THE PREFERRED EMBODIMENT

The present invention will allow the connection of post segments in a nearly invisible manner while retaining substantially the same structural strength as the original post itself.

Figure 1:
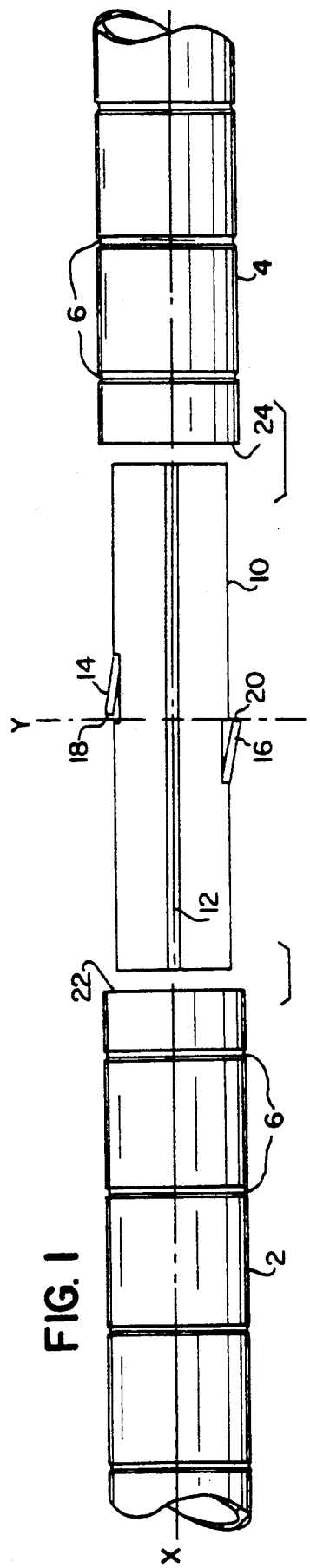
FIG. 1 is a side view of the first and second posts, and the connector sleeve according to a first preferred embodiment of the present invention.

In FIG. 1, a first hollow post segment 2 is connected to a second hollow post segment 4 using the connector sleeve or bushing 10, in accordance with a first embodiment of the present invention, inserted half-way into each of the post segments 2 and 4. As shown in the Figures the posts and connector sleeve are cylindrical. However, these elements may be of any desired cross-sectional configuration. The outside diameter of the sleeve 10 is designed to provide a tight friction fit with the inside diameter of the post segments 2 and 4. Alternatively, in some applications, the post segments 2 and 4 may each have a plurality of annular rings 6 on the inside surface thereof to provide the appropriate flush fit with the sleeve 10. For example, the outside diameter of the sleeve 10 is slightly larger than the inside diameter of the annular rings 6, but slightly smaller than the inside diameter of the post segments 2 and 4 at a location spaced from the annular rings 6.

The sleeve 10 has an axial or longitudinal compression slot 12 that allows the sleeve 10 to compress slightly as it is forced through the annular rings 6. Thus, the natural spring force in the sleeve 10 will tightly grip the annular rings 6 ensuring a solid, reliable connection. It is desireable that the width of the slot 12 in the relaxed state of the sleeve 10 be such that when the sleeve is inserted into a post section, the slot 12 collapses essentially completely. This configuration enhances the bending strength of the connection.

Figure 3:
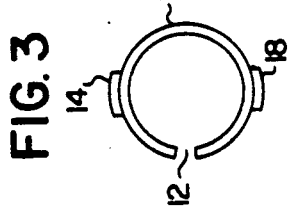
FIG. 3 is an end view of the connector sleeve shown in FIG. 1.

The sleeve 10 includes first and second protruding tabs 14 and 16, respectively, punched from or otherwise integrally formed in the side wall of the sleeve. These tabs are inclined or flare away from the major outer surface of the sleeve 10 in opposite directions as shown in FIGS. 1 and 3. The protruding tabs 14 and 16 have interference or abutment surfaces 18 and 20, respectively, that extend away from the outer surface of the sleeve 10 by a predetermined amount in order to effectively contact the edge surfaces 22 and 24 of the first and second post segments 2 and 4, as explained in greater detail below. For example, the very top of the abutment surface 18 may extend about 0.05 inch, and preferably 0.047±0.015 inch, away from the major outer surface of the sleeve 10. The interference or abutment surfaces are substantially coplanar relative to a radial cross-sectional plane Y of the sleeve at its center or are slightly spaced away from each other relative to the radial cross-sectional plane Y.

Figure 2:
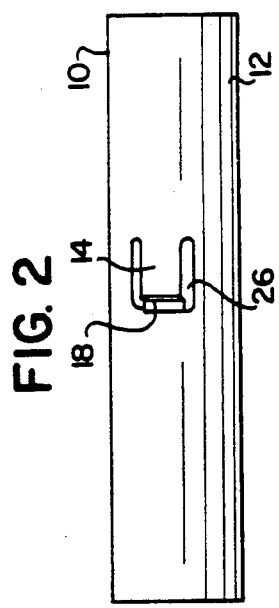
FIG. 2 is a top view of the connector sleeve shown in FIG. 1.

Each protruding tab 14 and 16 is preferably rectangular in shape as clearly shown in FIG. 2. The protruding tabs 14 and 16 are integral with the sleeve 10 and are formed therefrom by virtue of a punched U-shaped slot 26 bounding the tab. Such a configuration allows the sleeve 10 to be manufactured from a single piece of material, such as a single piece of rolled steel. The compression slot 12 and the U-shaped slots 26 are then cut in the sleeve 10 to produce the connector. Alternatively, a piece of steel can be rolled so as to leave an opening that defines the slot 12. The slots 26 can be cut before or after the rolling process.

FIG. 3 shows an end view of the sleeve 10 clearly depicting the slot 12 and the protruding tabs 14 and 16. It can be readily appreciated that the sleeve 10 can be dimensioned relative to the post segments such that natural resiliency of the material from of which the sleeve is made results in the sleeve having biasing forces that urge it tightly against the interior surfaces of the post segments 2 and 4, and that urge the tabs away from the side walls of the sleeve to interfere with the ends of the post segments.

Figure 4:
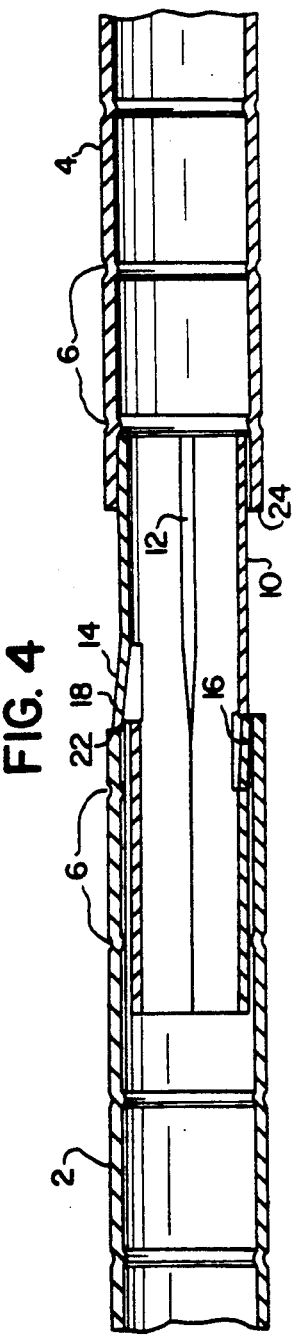
FIG. 4 is a cross-sectional view showing the connector sleeve of FIG. 1 partially installed between the first and second posts.

In FIG. 4, the connecting operation according to the preferred embodiment of the present invention is depicted in cross-section. In this operation the sleeve 10 is inserted into the post segments 2 and 4, and the post segments are pressed together. When the end of the sleeve 10 contacts the annular rings 6 in one of the post segments, the sleeve 10 will become compressed by the annular rings with compression slot 12 narrowing as the sleeve is inserted. The sleeve 10 will thus slide, for example, into the post segment 2 until the abutment surface 18 of the protrusion tab 14 contacts the engaging end surface 22 of the post segment. In the meantime, the protrusion tab 16, which inclines in the opposite direction from the protrusion tab 14, is pushed inwardly relative to the sleeve by the inside surface of the post segment 2 until it may become substantially flush with the outer surface of the sleeve 10, or projects slightly outwardly therefrom.

When the sleeve 10 can be inserted no further into the post segment 2 due to the interference of the abutment surface 18 with the engaging surface 22, continued pressure on the post segments 2 and 4 will cause the sleeve 10 to compress and slide within the annular rings 6 of the post segment 4. When the engaging surface 24 of the post segment 4 contracts the inclined surface of the protruding tab 14, the tab 14 will be pushed inwardly of the sleeve so as to become substantially flush with the outer surface of the outer sleeve 10. When this movement occurs, the post segment 4 will contact the post segment 2 at their engaging surfaces 24 and 22, respectively. Therefore, the sleeve 10 will be invisible from the outside, yet will be firmly gripped by the annular rings 6 in each of the post segments 2 and 4. Further, the compression slot 12 will result in a constant biasing force existing between the sleeve 10 outwardly toward the annular rings 6, thus ensuring that the sleeve 10 will remain in its proper location. Still, further, the fact that the abutment surfaces 18 and 20 of the protruding tabs 14 and 16 are substantially coplanar relative to a radial cross-section at the center of the sleeve 10 will ensure that substantially one half of the sleeve 10 will be received in each of the post segments 2 and 4. Therefore, the joint between the post segments 2 and 4 will be very strong and quite resistant to bending.

As described above, the one-piece sleeve 10 can be used quickly and easily to connect the post segments 2 and 4 without tools, specialized knowledge, or extra steps. Further, it is readily apparent that the one-piece connector sleeve 10 is easy to manufacture, requiring only minimum rolling, cutting, punching, or bending.

Disassembly of the above-discussed structure is also easy. The post segments 2 and 4 are merely pulled apart and the sleeve 10 is removed therefrom. Since no permanent deformation of the sleeve 10 occurs during assembly, a disassembled sleeve 10 can be used again with the same or different post segments. Therefore, the flexibility and reconfigurability of the present invention will offer advantageous to the manufacturer and user alike.

Figure 5:
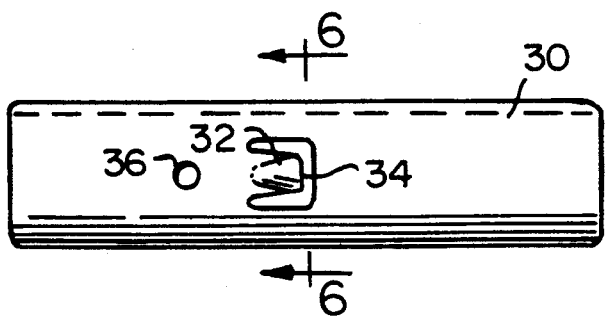
FIG. 5 is a top view of a connector sleeve according to a further embodiment of the present invention.

A further embodiment of the present invention will now be described with reference to FIGS. 5 through 10. This further embodiment features a connector sleeve 30 having protrusion tabs, which are angled or fluted in cross-section, and a compression slot having angled end portions. In FIG. 5, the sleeve 30 is generally similar to the sleeve 10 of FIG. 1, but includes an angled or fluted protrusion tab 32. The FIG. 7 shows an identical but oppositely inclined protrusion tab 38 on the diametrically opposed side of the sleeve 30. Protrusion tabs 32 and 38 are similar to the protrusion tabs 14 and 16 of FIG. 1, but are bent toward the major surface of the sleeve adjacent the abutment ends 34 and 40 at an angle of approximately 90 degrees, with a vertex projecting away from the major sleeve surface (See FIG. 10). The protrusion tabs 32 and 38 thus also have a flute-like shape that is flared open in a direction toward the abutment surfaces 34 and 40 as shown, for example, in the plan view of FIG. 9.

The fluted protrusion tabs 32 and 38 provide additional advantages over the shape of the protrusion tabs 14 and 16. First, since the abutment surfaces 34 and 40 are bent toward the major sleeve surface they present a rounded outer edge that contacts the inner surface of the hollow post (See FIG. 10). This rounded edge enhances the movement of the protrusion tabs 32 and 38 inwardly since less surface area is available for interference contact with the contact surface of the hollow post. That is, for example, when the abutment surface 34 is in contact with the contact member of a first hollow post, movement of the second hollow post along the included surface of the protrusion tab 32 will push the protrusion tab 32 inward toward the interior of the sleeve 30. Since the edge of the protrusion tab 32 is rounded, it will more easily slide against the contact surface of the abutting first hollow post.

Still another advantage of this second embodiment is that the fluted tabs have an effective thickness greater than the actual thickness of the material from which they are made and therefore the performance of the tab is less dependent on the angle at which it is bent from the outer surface of the sleeve. Furthermore, the tabs are less likely to collapse in an axial direction after they abut an engaging surface of one post.

FIG. 5 depicts a hole 36 passing through to the interior of the sleeve 30. This hole 36 may be used as an identifier or to ease manufacturing and/or assembly steps of the resultant structures.

Figure 6:
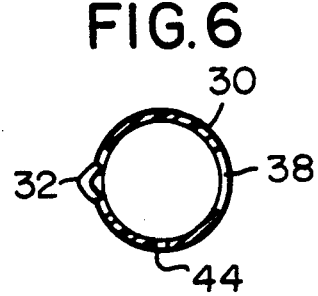
FIG. 6 is a cross-section of the connector sleeve shown in FIG. 5 taken along plane 6—6 thereof.
Figure 7:
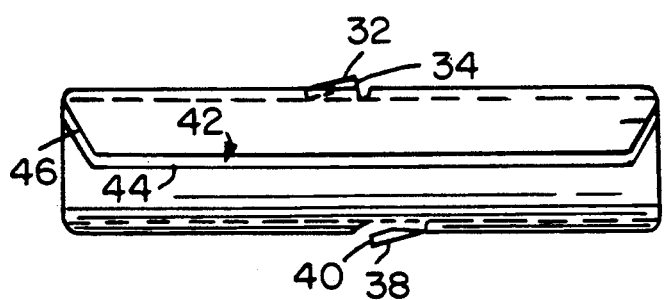
FIG. 7 is a side view of the further embodiment of the present invention.

FIG. 6 is a cross-sectional view of the embodiment shown in FIG. 5 taken along plane 6—6 thereof. The fluted end of the protrusion tab 32 is clearly visible, while the generally flat inclined portion of the protrusion tab 38 is visible on the opposite side of the sleeve 30 from the tab 32.

FIG. 7 is a side view of the sleeve of the embodiment shown in FIG. 5. The fluted protrusion tabs 32 and 38 are clearly visible as being inclined in generally opposite directions and having their respective abutment surfaces 34 and 40 located in the same radial plane. Note that the protrusion tabs 32 and 38 extend above the outer surface of the sleeve 30 by a distance which is approximately equal to the thickness of the protrusion tabs. This choice of dimension is advantageous for the following reason. If the protrusion tabs 32 and 38 extend too far above the surface of the sleeve 30, the contact surface of a hollow member may be forced between the outer surface of the sleeve 30 and the protrusion tab itself, preventing assembly of the structure. Further, tabs which extend outward a great deal from the outer surface of the sleeve 30 will require a great force to compress them into the respective hollow members. However, if the tabs are not bent sufficiently outwardly from the major surface of the sleeve, they will not properly interfere with the respective contact surfaces of the posts.

In FIG. 7, the compression slot 42 is depicted as extending generally axially along the sleeve 30. The compression slot 42 comprises the longitudinally-extending middle portion 44 and the angled end portions 46 and 48. The angled end portions 46 and 48 will prevent parts from interlocking during production and packaging. The portions 46 and 48 shown in FIG. 5 are angled at approximately 60 degrees with the respect to the longitudinal axis of the sleeve 30. However, those of skill in this field will readily understand that this angle may be varied from one degree to 89 degrees, depending upon the size of the particular structure.

Figure 8:
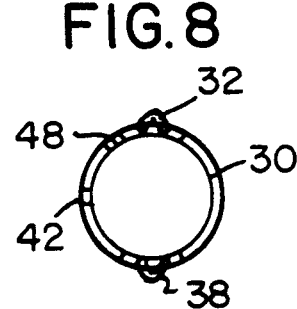
FIG. 8 is a end view of the embodiment shown in FIG. 7.

FIG. 8 is an end view of the FIG. 7 sleeve showing the fluted protrusion tabs 32 and 38. Furthermore, the compression slot 42 is shown substantially halfway between the protrusion tabs 32 and 38 relative to the circumference of the sleeve.

Figure 9:
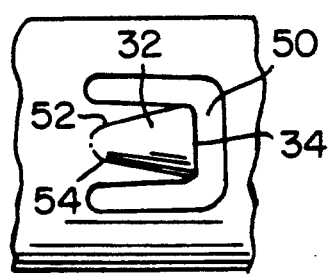
FIG. 9 is a close-up plan view of the fluted rectangular tab according to the further embodiment of the present invention.

FIG. 9 is an enlarged plan view of the protrusion tab 32. As with the first embodiment, a U-shaped opening 50 bounds the protrusion tab 32. Lines 52 and 54 show that the protrusion tab 32 is flared inwardly from the abutment surface 34 toward the major surface of the sleeve to open outwardly in the opposite direction.

Figure 10:
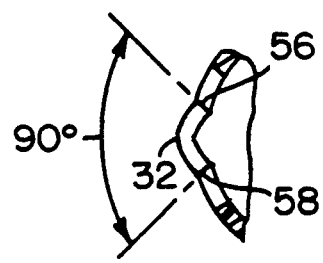
FIG. 10 is an end view of the fluted tab shown in FIG. 9.

FIG. 10 is an end view of the protrusion tab 32 viewed from the abutment surface 34. It can be seen that the outer edges 56 and 58 of the protrusion tab 32 form an angle of approximately 90 degrees so that the sides of the flute-like structure form an angle of approximately 90 degrees to define an arcuate apex. While this configuration is believed to be the most effective, the angle may be varied from 90 degrees.

The preferred material for the connector sleeve is metal, most preferably cold rolled steel. This material is very strong and also flexible and resilient. However, those of ordinary skill in this field understand that other materials, such as plastics, composites, and the like may be used depending upon the application for which the posts are designed.

Thus, what has been described is a light-weight, easy to manufacture, easy to assemble post connector capable of supporting great loads in a variety of applications. The present invention will find use in warehouses, stores, homes, or other places where assembly of the post segments to form extended supports is desireable.

While the present invention has been described with respect to what is presently considered to be the preferred embodiments, it is to be understood that the invention is not limited to these disclosed embodiments. On the contrary, the present invention is intended to cover various modifications and equivalent structures included within the spirit and scope of the following claims.

What is claimed is:

1. A connector for connecting together first and second hollow posts each having an end surface, said connector comprising:
   a sleeve dimensioned to fit inside both the first and second posts;
   a first flexible protrusion formed in said sleeve and having a first interference surface adapted to abut the end surface of the first post when said sleeve is inserted into the first post, said first protrusion being fluted in cross-section adjacent said first interference surface; and
   a second flexible protrusion formed in said sleeve and having a second interference surface adapted to abut the end surface of the second post when said sleeve is inserted into the second post, said second protrusion being fluted in cross-section adjacent said second interference surface;
   each of said first and second flexible protrusions having two side edge surfaces disposed substantially perpendicularly to each other.

2. A connector according to claim 1, wherein said first and second flexible protrusions extend in substantially opposite directions, are disposed on substantially opposite sides of said sleeve, and have said first and second interference surfaces disposed in substantially the same radial plane.

3. A connector according to claim 1, wherein said first and second flexible fluted protrusions flare inwardly away from the respective first and second interference surfaces associated therewith.

4. A connector according to claim 1, wherein said sleeve has a substantially circular cross section, and wherein said first and second flexible protrusions have arcuate cross-sections.

5. A connector for connecting together first and second hollow members, each member having a contact surface, said connector comprising:
   an insert adapted to be inserted into both the first and second hollow members;
   a first resilient tab formed on an outer surface of said insert and adapted to abut the contact surface of the first hollow member when said insert is inserted therein, said first tab being movable toward an interior of said insert when the contact surface of the second hollow member contacts said first tab as said insert is being inserted in the second hollow member; and
   a second resilient tab formed on the outer surface of said insert and adapted to abut the contact surface of the second hollow member when said insert is inserted therein, said second tab being movable toward the interior of said insert when the contact surface of the first hollow member contacts said second tab as said insert is being inserted in the first hollow member;
   wherein each of the hollow members has at least one ridge formed on an inner surface thereof, and wherein said insert has an outside dimension which is larger than an inside dimension of the ridges but smaller than an inside dimension of the remaining portion of the hollow members; and
   wherein said first and second tabs each has a fluted cross section.

6. A connector according to claim 5, wherein said first and second resilient tabs are inclined in opposite directions at an angle with respect to the major outer surface of said insert.

7. A connector according to claim 5, wherein said first and second resilient tabs are flared in a direction away from the corresponding hollow member contact surface.

8. A connector according to claim 5, wherein each of said first and second resilient tabs has a substantially rectangular shape.

9. A connector according to claim 5, wherein said first and second resilient tabs are disposed on opposite sides of said insert and have substantially coplanar abutment surfaces which contact the contact surfaces.

10. A connector for connecting together first and second hollow members each having an end surface, said connector comprising:
    a hollow sleeve dimensioned to fit within the first and second hollow members;
    a first rectangular, resilient protrusion inclining upwardly from said sleeve in a first direction and having a first contact surface for abutting the end surface of the first hollow member, said first protrusion having a fluted cross section at said first contact surface; and
    a second rectangular, resilient protrusion inclining upwardly from said sleeve in a second direction opposite the first direction, said second protrusion having a second contact surface for abutting the end surface of the second hollow member, said second protrusion having a fluted cross section at said second contact surface;
    each of said first and second protrusions having two side edge surfaces disposed substantially perpendicularly to each other.

11. A connector according to claim 10, wherein said first and second resilient protrusions are each fluted in a direction away from the respective contact surface.

12. A connector according to claim 10, wherein each of said first and second resilient protrusions extends above an outside surface of said sleeve by a distance substantially equal to a thickness of the corresponding protrusion.

13. A connector according to claim 10, wherein said first and second resilient protrusions are disposed on opposite sides of said sleeve, and wherein said first and second contact surfaces are substantially coplanar.

14. A connector according to claim 10, wherein said first and second resilient protrusions are each fluted inwardly at substantially ninety degrees in cross section at their respective contact surfaces.

15. A connector for connecting together first and second hollow posts each having an end surface, said connector comprising:
 a sleeve dimensioned to fit inside both the first and second posts, a non-linear compression slot being defined along the length of said sleeve and having at least a portion which extends at an angle to the longitudinal axis of said sleeve;
 a first flexible protrusion formed in said sleeve and having a first interference surface adapted to abut the end surface of the first post when said sleeve is inserted into the first post; and
 a second flexible protrusion formed in said sleeve and having a second interference surface adapted to abut the end surface of the second post when said sleeve is inserted into the second post.

16. A connector according to claim 15, wherein said non-linear compression slot has an intermediate portion extending generally in the direction of the longitudinal axis of said sleeve and two end portions extending at an angle from said intermediate portion to an opposite end of said sleeve.

17. A connector according to claim 16, wherein each of said two end portions of said compression slot extends at an angle of about 60 degrees with respect to the longitudinal axis of said sleeve.

* * * * *